(12) United States Patent
Winterowd et al.

(10) Patent No.: US 9,440,418 B2
(45) Date of Patent: Sep. 13, 2016

(54) THERMALLY INSULATING LOW DENSITY STRUCTURAL WOODEN COMPOSITE

(75) Inventors: Jack G. Winterowd, Puyallup, WA (US); Glen Robak, Meridian, ID (US); Travis E. Bjorkman, Bonney Lake, WA (US)

(73) Assignee: Weyerhaeuser NR Company, Federal Way, WA (US)

(*) Notice: Subject to any disclaimer, the term of this patent is extended or adjusted under 35 U.S.C. 154(b) by 204 days.

(21) Appl. No.: 13/572,979

(22) Filed: Aug. 13, 2012

(65) Prior Publication Data

US 2014/0044916 A1    Feb. 13, 2014

(51) Int. Cl.
| | | |
|---|---|---|
| *B32B 21/14* | (2006.01) | |
| *B32B 21/06* | (2006.01) | |
| *B32B 21/02* | (2006.01) | |

(52) U.S. Cl.
CPC .............. *B32B 21/06* (2013.01); *B32B 21/02* (2013.01); *B32B 21/14* (2013.01); *B32B 2260/026* (2013.01); *B32B 2260/046* (2013.01); *Y10T 428/24074* (2015.01); *Y10T 428/249921* (2015.04); *Y10T 428/268* (2015.01)

(58) Field of Classification Search
CPC ......... B32B 21/14; B32B 3/18; B32B 21/00; B32B 3/10; B32B 5/02
USPC .......................................... 428/107, 35.6, 106
See application file for complete search history.

(56) References Cited

U.S. PATENT DOCUMENTS

| | | | |
|---|---|---|---|
| 5,506,026 A  * | 4/1996 | Iwata et al. ................... | 428/107 |
| 2004/0209102 A1 | 10/2004 | Chen | |
| 2006/0230707 A1 | 10/2006 | Roe | |
| 2007/0298199 A1* | 12/2007 | Lawson ........................ | 428/35.6 |
| 2010/0015390 A1* | 1/2010 | Pu et al. ........................ | 428/106 |
| 2011/0039090 A1 | 2/2011 | Weinkotz | |

FOREIGN PATENT DOCUMENTS

| | | |
|---|---|---|
| CA | 2 354 640 A1 | 2/2003 |
| EP | 0 199 511 A2 | 10/1986 |
| WO | 2011/066963 A1 | 6/2011 |

* cited by examiner

*Primary Examiner* — Brent O'Hern
(74) *Attorney, Agent, or Firm* — Perkins Coie LLP

(57) ABSTRACT

Wood-based composites, and methods for their manufacture, are provided. The composites include oriented wooden strands and cured bonding resin connecting adjacent strands. The composites are relatively low-density, having an average dry density of the wooden composites of about 15-28 pounds per cubic foot (pcf). The unique composition of the composites provide improved structural and insulating (thermal and acoustic) properties when compared to traditional engineered wood products (e.g., oriented strandboard).

19 Claims, No Drawings

THERMALLY INSULATING LOW DENSITY STRUCTURAL WOODEN COMPOSITE

BACKGROUND

Wooden panels are commonly used as sheathing material in North American residential construction. In these applications the wooden panels are attached to framing members (usually wood-based) by use of metallic fasteners in floors, walls and roofs. Key requirements of the panels have historically included structural and enclosure functions. In many cases the sheathing panels must also act as a "nailing base" for adjacent building materials. For instance, exterior siding is often nailed directly to exterior wall sheathing. Shingles are generally tacked to roof sheathing. Decorative hardwood flooring is stapled or otherwise connected to floor sheathing.

As global demand for energy and conservation have recently increased, code requirements for thermal insulation have been elevated. This situation has created a need for materials with greater thermal insulation to be incorporated into the framing and sheathing elements of the building envelop. Conventional wooden sheathing panels, including plywood and oriented strandboard (OSB), generally have a thermal resistance value (R value) of about 0.45-0.75 hr·ft$^2$F/BTU, which is insufficient to meet emerging energy codes without the use of supplemental insulating materials. In contrast, closed-cell polyurethane rigid foam insulation boards that are filled with argon can have a thermal resistance per inch value of about 3.0-5.5 hr·ft$^2$F/BTU, for 0.5" and 1.0" thick rigid foam, respectively.

Manufacturers of polyurethane rigid foam insulation board recommend the use of these products in wall systems either as an additional layer adjacent to wooden sheathing panels or in some cases as a replacement for the wooden sheathing panels. In many cases, use of the polyurethane rigid foam insulation board in this manner will satisfy energy code requirements. Unfortunately, the polyurethane rigid foam insulation board has structural properties that are substantially less than those of the wooden sheathing. Thus, replacing the wooden sheathing with polyurethane rigid foam insulation board generally decreases the racking strength and out-of-plane bending strength of the wall and its ability to resist wind and seismic loads. Use of the polyurethane rigid foam insulation board as a replacement for wooden wall sheathing also creates a situation in which exterior siding can no longer be nailed directly into the wall sheathing. This complication can be partially overcome if installers are sufficiently skilled to inject nails through the exterior siding, through the foam board and into the wooden studs inside of the wall, but the gap between the portion of the nail that is in the exterior siding and that which is in the wooden stud will be subjected to high shear and bending stresses that are not normally present when the exterior siding is attached directly to a structural material. Thus, builders have been resistant to utilize the polyurethane rigid foam insulation board and have expressed a need for alternative building materials that will allow them to comply with new energy codes without adversely impacting structural properties and with minimum change to traditional building practices.

Codes have also emerged regarding sound transmission in both residential and commercial construction in the United States. In general, these codes require the use of materials that limit transmission of sound across floors and walls to a given threshold.

In view of the needs of the construction industry described above, improved materials for reducing sound and thermal transmission are desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a composite is provided. The composite has a thickness dimension, and includes: a compressed plurality of wooden strands, each having length, width, and thickness dimensions, wherein the wooden strands are oriented such that the length and width dimensions are each orthogonal to the thickness dimension of the composite; and cured bonding resin structurally connecting the plurality of wooden strands; wherein the average dry density of the wooden composite is from about 15 to about 28 pounds per cubic foot.

In another aspect, a method for forming the composites described above is provided. In one embodiment, the method includes the process of (1) applying bonding resin to strands; (2) forming the resin-treated strands into a mat with the width and length dimensions of the strands generally in the plane of the width and length dimension of the mat; and (3) applying heat and pressure to the thickness dimension of the mat to an extent that cures the bonding resin and achieves an average dry density of the wooden strands of about 15-26 pcf.

DETAILED DESCRIPTION

Wood-based composites, and methods for their manufacture, are provided. The composites include oriented wooden strands and cured bonding resin connecting adjacent strands. The composites are relatively low-density, having an average dry density of the wooden composites of about 15-28 pounds per cubic foot (pcf). The unique composition of the composites provide improved thermal insulating properties and adequate internal bond strength when compared to traditional engineered wood products (e.g., oriented strandboard).

In one aspect, a composite is provided. The composite has a thickness dimension, and includes: a compressed plurality of wooden strands, each having length, width, and thickness dimensions, wherein the wooden strands are oriented such that the length and width dimensions are each orthogonal to the thickness dimension of the composite; and cured bonding resin structurally connecting the plurality of wooden strands.

Suitable wooden strands can be comprised of different wood species, including alder, aspen, basswood, eastern cottonwood, hemlock, black poplar, yellow poplar, lodgepole pine, red pine, sugar pine, white pine, juvenile southern yellow pine, fir, or other common species. The strands can have a thickness of about 0.010-0.150" (average), but a preferred thickness is about 0.015-0.050". The length of the strands can be about 0.25-8' and the length dimension is approximately parallel (i.e., within 30 degrees) to the grain direction of the wood. A strand length of about 2.0-6.0" is preferred. The width of the strands is about 0.100-2.00", and a preferred width is about 0.25-1.50".

In general the width and length dimensions of the strands should both be at least five times greater than the thickness dimension. In certain embodiments, the width and length dimensions of the strands are both at least ten times greater than the thickness dimension. Strands that satisfy these criteria will have a "plate-like" shape. Composites comprised of multiple layers of plate-shaped strands that are not highly consolidated will contain a multitude of small spaces between the strands. Such a composite structure will be associated with reduced thermal conductivity, especially along the axis of the composite that is parallel to the thickness dimension of the strands.

In certain embodiments, the length dimension of the strands is greater than the width dimension of the strands. The wooden strands constitute the essential structural element of the composite. In general the bending stiffness and bending strength of the composite will be improved as the size and aspect ratio of the wooden elements are increased. The bending strength of the composite can be increased selectively along one particular axis by predominantly aligning the length of a majority of the strands parallel to this same axis. This technique will be most effective when the length of the strands near the top and bottom major surface of the composite are aligned parallel to one particular axis that has been targeted for maximum bending strength and bending stiffness. For instance, in one embodiment the composite might have a length of 9' and a width of 4' and a thickness of 0.75". If the length axis is targeted for maximum bending strength and bending stiffness, then it would be most beneficial to align the length of the strands on the top and bottom major surfaces of the composite parallel to the length of the composite. For many building applications it can be advantageous to have increased bending strength and bending stiffness along one particular axis of the composite.

Types of cured resin include cured phenol-formaldehyde resin, cured melamine-formaldehyde resin, cured urea-formaldehyde resin, cured epoxy resin, cured polyurea, or cured polyurethane. As used herein, the term "cured" means that the resin has been polymerized and/or crosslinked to the extent that the resin will not melt (be converted from a solid to a liquid) when continuously heated at 1 atmosphere of pressure. "Cured resins" that are heated in a manner that causes the temperature of the cured resin to continuously increase will eventually undergo thermal degradation (including combustion or pyrolysis), but the "cured resin" will not melt.

"Cured phenol-formaldehyde resin" is comprised of a mixture of salts (usually the sodium salt, although other metals such as potassium can be used) of phenol-formaldehyde adducts that has a weight average molecular weight greater than about 3,000 Da, and a ratio of methylene linkages to phenolic nuclei of about 1.2 or greater. Cured melamine-formaldehyde resin is comprised of a mixture of melamine-formaldehyde adducts that has a weight average molecular weight greater than about 3,000 Da and a ratio of methylene linkages to melamine nuclei of about 1.5 or greater. Cured urea-formaldehyde resin is comprised of a mixture of urea-formaldehyde adducts that has a weight average molecular weight greater than about 3,000 Da and a ratio of methylene linkages to urea nuclei of about 1.0 or greater. Cured epoxy resin is comprised of a mixture of adducts of bisphenol 'A', epichlorohydrin, and minor amounts multifunctional amine, and has a weight average molecular weight greater than about 3,000 Da. Cured polyurea is generally comprised of a mixture of compounds comprised of methylene diphenyl nuclei connected together through urea linkages and has a weight average molecular weight of greater than about 3,000 Da. Cured polyurethane is generally comprised of a mixture of compounds of methylene diphenyl nuclei connected together through urethane linkages and has a weight average molecular weight of greater than about 3,000 Da. Other cured resins known to those of skill in the art can be used, as long as they connect adjacent strands and effectively transfer structural loads throughout the composite.

In general, the cured resin in the composite will be located on the outer surface of the individual wooden strands, although a portion of the cured resin might also be located inside individual wooden strands (e.g., in pores or canals or lumens).

The cured resin level in the composite can range from about 1.0-20.0% based on the solids mass of the resin and the dry mass of the wood. For water-based resins, such as phenol-formaldehyde resins, the solids mass is determined by multiplying the total wet mass of the resin by the "percent solids" value of the resin and dividing by 100%. The "percent solids" value is obtained, for example, experimentally by loading a small aluminum weighing pan (about 5 cm diameter with a lip that is about 2 cm) with about 1 g of wet resin (actual mass measured to four significant digits) and heating the loaded pan in a vented oven that is maintained at a temperature of 125° C. for a period of 3.5 hours at 1 atm of pressure. The mass of the residual cured resin in the pan is then measured to four significant digits and the "percent solids" value is calculated by dividing the residual mass by the original wet mass of the resin and multiplying this quotient by 100. For liquid resins that are neither water-based nor solvent-based, such as pMDI, the percent solids value of the resin is assumed to be 100%.

One or more types of cured resin can be present in the composite. When two or more types of cured resin are present they can be homogenously mixed together or they can be located in separate regions or layers of the composite. In certain embodiments, the resin contains cured phenol-formaldehyde resin in the outer, surface layer of the composite and cured polyurea in the inner, core layer of the composite. In this embodiment the level of cured phenol-formaldehyde resin in the surface layer can be about 1.0-20.0%, and a preferred level is about 6.0-12.0%. It should be noted that commercial oriented strand board typically does not contain cured phenol-formaldehyde resin in the surface layer at levels greater than about 7.0%. This is due to a process limitation that generally prevents the manufacturer from utilizing water-based phenol-formaldehyde resins at levels greater than about 7% on a solids basis without risk of localized explosive delamination at the end of the hot-pressing process. When cured polyurea (derived from pMDI) is used in the core layer of the composite, it can be present at levels of about 1.0-20.0%. A preferred level of polyurea in the core layer is about 6.0-12.0%. Preferred resin levels in the composite are greater than those typically used to make commercial oriented strand board.

The spatial arrangement of the wooden strands provides many desirable characteristics of the composite. The thickness dimension of the strands should be approximately parallel to each other (i.e., within 30 degrees). The strands are not tightly compressed and consolidated (as is the case for oriented strand board). Instead, the strands must be consolidated only to a point at which some level of strand-to-strand contact exists in order to facilitate strand-to-strand bonding, but not so much consolidation that most of the void space in the composite is eliminated. This balance is specifically achieved when the dry wood density of the composite is about 15-26 pcf. Accordingly, in certain embodiment, the average dry density of the wooden strands within the composite is from about 15 to about 26 pounds per cubic foot.

Surprisingly, the combination of (1) the use of wooden strands that have length and width dimensions that are both greater than about ten times the thickness dimension; and (2) a dry wood density value in the range of about 15-26 pcf; results in a composite that simultaneously satisfies certain strength and thermal resistance requirements associated with new building practices. The internal bond strength value is particularly great when the strands used to make the composite are derived from wood that has a specific gravity that is less than about 0.45 and the resin level in the composite is about 6% or greater.

Density values for either the finished composite or blocks of wood that will be cut into strands, which will be used to make the composite, can be determined by measuring the mass and volume of the wooden object and subsequently dividing the mass by the volume to yield the "density". The volume of a wooden object with a parallelepiped-shape is simply determined by multiplying the width, length and thickness dimensions. The volume of other wooden objects that have more complex shapes can either be calculated based on dimension measurements or determined by certain fluid displacement techniques. Because wooden objects readily absorb water, which can alter both the mass and the volume of the object, it is less ambiguous to measure and express the density of these materials on a "dry" basis. Dry wooden objects can be obtained by heating them in an oven at a temperature of about 105° C. and a pressure of about 1 atm for a period of time sufficient to achieve no further significant change in mass. The time required to achieve "constant mass" will be longer for larger wooden objects than it will for smaller wooden objects. In general a wooden object having a length, width and thickness of 1" each and an initial moisture content of 20% might require about 4 h of time in an oven at a temperature of 105° C. and 1 atm of pressure in order to be essentially dry. The percent "moisture content" value for wooden objects is calculated by dividing the water mass of the wooden object by the dry mass of the wooden object and multiplying this quotient by 100%. "Specific gravity" is a unitless metric obtained by dividing the density of wood by the density of water with both measurements conducted in air and not corrected for buoyancy. Wood types suitable for conversion into strands and incorporation into the composite that have a specific gravity less than about 0.45 include alder, aspen, basswood, eastern cottonwood, hemlock, black poplar, yellow poplar, lodgepole pine, red pine, sugar pine, white pine, juvenile southern yellow pine, and fir. Wood types having a specific gravity less than about 0.45 can be made into strands that provide greater strand-to-strand contact in the composite, and thus are associated with improved strand-to-strand bonds.

Because the cured resin in the composite contributes to the mass of the material without significantly contributing to the volume, the dry density of the whole composite material can be about 15-28 pcf. Accordingly, in certain embodiments, the average dry density of the wooden composite is from about 15 to about 28 pounds per cubic foot.

In certain embodiments, the composite consists essentially of the wooden strands and the cured bonding resin. As used herein, the term "consists essentially of" indicates that the composite includes only the wooden strands, cured bonding resin, and possibly minor additives. These additives include wax (e.g., to form OSB), biocides, pesticides, insecticides, fungicides, sealants, resinous coatings, polymeric coatings, paper-based coatings, wax coatings, colorants, inks and other. Whenever these additional additives are present, the continuous phase of wooden strands within the composite are arranged in a spatial orientation such that the average dry density of the wooden strands within the composite is about 15-26 pcf; the length and width dimensions of the strands must be generally orthogonal to the thickness dimension of the composite; and adjacent strands in the composite are connected together with cured bonding resin.

The dimensions of the composite can vary depending upon the intended application. Generally, the thickness dimension will be at least ten times less than that of the width and length dimensions. In most cases the thickness of the composite will be about 0.1-5.5 inches. The width and length dimensions will be about 2-24 feet. The thickness dimension of the composite is parallel to the thickness dimension of the individual strands within the composite.

The composite can have the form and general appearance of any engineered, structural wood product known to those of skill in the art. For example, the composite may be oriented strandboard (OSB), laminated strand lumber (LSL; e.g., TimberStrand® manufactured by Weyerhaeuser NR), or parallel strand lumber (e.g., Parallam® manufactured by Weyerhaeuser NR).

Oriented strandboard and flakeboard have been commercially available in North America since about 1980 and have had density values that range from about 32-46 pcf. Many patents and academic publications have been issued on various alternative forms, but none of these describe a wooden strand-based composite having a dry wood density lower than 26 pcf (see EP199511A2, Derik Barnes; US20040209102A1, Rob Wellwood; CA2354640A1; US20110039090A1; WO2011066963A1; US20060230707A1).

The thermal resistance values of the composites are greater than about 0.9 hr·ft$^2$F/BTU in the "composite thickness" direction with a corresponding dry strand basis weight of about 1.4-1.6 lb/ft$^2$. This compares to conventional oriented strand board, which has thermal resistance values of about 0.45-0.75 hr·ft$^2$F/BTU in the composite thickness dimension with a corresponding basis weight of about 1.2-1.5 lb/ft$^2$. The increased level of void space between the strands contributes to the insulating properties of the disclosed material. Surprisingly, this low-density material has strength properties that are similar to that of conventional oriented strand board with a dry wood density of about 34 pcf or higher. Thus, some embodiments of the new composite material have thermal resistance values of greater than about 1.2 hr·ft$^2$F/BTU and internal bond strength values of greater than about 50 psi with a corresponding dry strand basis weight of about 1.5 lb/ft$^2$. This is a unique combination of strength and insulating properties, and to the best of our knowledge, development of such a wooden, strand-based insulating material has not been previously attempted or contemplated. The combination of structural and insulating properties makes this material uniquely suitable for many contemporary building applications.

In certain embodiments, the composite has an internal bond strength of greater than about 20 PSI. Although specific internal bond strength values are usually not directly specified for strand-based materials in North American construction or building applications, the metric is commonly utilized by OSB manufacturers as an indication of the strength and integrity of the strand-to-strand bonds. In general, internal bond strength values tend to be a more sensitive measure of the quality of the strand-to-strand bonds compared to bending strength tests. A detailed description of the process used to measure internal bond strength of a strand-based composite is provided in ASTM D1037 (formerly the American Society for Testing and Materials, West Conshohocken, Pa.). In general, blocks of a strand-based composite that are 2.0" wide×2.0" long, and having a thickness that is simply that of the composite, are structurally glued to steel blocks on the top and bottom major surfaces. The top and bottom steel blocks are then clamped to fittings within a tensile type Instron Machine (Norwood, Mass.) (Pull Tester). Forces are exerted on the specimen upward from the top of the specimen and downward from the bottom of the specimen to achieve a tensile load that is parallel to the thickness dimension of the composite. It is common for the tensile load applied to the specimen to be increased at a rate that achieves a constant displacement (expansion) rate between the top and bottom surface of the specimen (for instance 2.0" per minute). During this process both the tensile load and the displacement are commonly measured and recorded as a function of time. During the initial stages there is typically a proportional relationship between displacement and load, but within a very short period of time (usually less than 2 s) catastrophic failure within the test specimen occurs (usually a bond between strands breaks) and the applied load required to achieve a constant displacement rate decreases abruptly and substantially. Thus, the process is associated with a maximum tensile load (just prior to catastrophic failure), and this value is usually considered to be the "internal bond strength" of the strand-based composite. The internal bond strength is expressed in units of force per specimen area that is orthogonal to the tensile stress. It is quite common in the United States for the internal bond strength of a strand-based composite to be expressed in units of pounds per square inch of specimen area orthogonal to the tensile stress (typically 4.0 $in^2$).

In certain embodiments, the composite is one layer in an assembly comprising a plurality of layers of composites formed from wooden strands and cured bonding resin. For example, the plurality of layers may comprise an oriented strandboard assembly formed using the methods described below. In certain further embodiments, at least two of the plurality of layers differ in composition in at least one characteristic selected from the group consisting of wooden strand type, wooden strand dimension, wooden strand orientation, bonding resin type, bonding resin amount, ratio of wooden strand to bonding resin, presence of an additive, and type of additive. By varying the composition of layers of an engineered wood assembly, advantageous properties can be provided, as known to those of skill in the art. For example, by varying the orientation of the strands between layers, the strength properties of the assembly can be tailored to specific end uses.

In another aspect, a method for forming the composites described herein is provided. In one embodiment, the method includes the process of (1) applying bonding resin to strands; (2) forming the resin-treated strands into a mat with the width and length dimensions of the strands generally in the plane of the width and length dimension of the mat; and (3) applying heat and pressure to the thickness dimension of the mat to an extent that cures the bonding resin and achieves an average dry density of the wooden strands of about 15-26 pcf.

Wet strands suitable for this process can be cut from wet logs (tree stems) including those of alder, aspen, basswood, eastern cottonwood, hemlock, black poplar, yellow poplar, lodgepole pine, red pine, sugar pine, white pine, juvenile southern yellow pine, fir, or other common species. The stranding process works best when it is conducted on fresh, green, wet logs. In many cases harvested logs will be soaked in heated ponds in order to further hydrate and soften the wood tissue prior to stranding. During the winter months in cold regions of North America, the heated ponds further serve to thaw frozen logs. Ideally, the moisture content of the logs during the stranding process should be about 40-150%. This tends to promote the creation of strands that have dimensions that are suitable for the composites and minimizes the creation of small particles. Particles that are smaller than about ⅜" are commonly referred to as 'fines'. It is also desirable to remove bark from the logs prior to cutting them into strands. Machines, known as "flakers" or "stranders", which are suitable for cutting the strands, include those made by Carmanah Design and Manufacturing Incorporated (Surrey, BC, Canada).

Suitable logs can be made from different tree species, including aspen, oak, poplar, pine, maple, fir, or other common species. The strands can have a thickness of about 0.010-0.150", but a preferred thickness is about 0.015-0.050". The length of the strands can be about 0.25-8" and the length dimension is approximately parallel to the grain direction of the wood. A strand length of about 2.0-6.0" is preferred. The width of the strands is about 0.100-2.00" and a preferred width is about 0.25-1.50". In general the width and length dimensions of the strands should both be at least ten times greater than the thickness dimension. In many cases it will be beneficial for the length dimension to be greater than the width dimension.

Mixtures of freshly cut strands and fines are then processed through dryers in order to reduce the moisture content of the wood to a level of about 0-10% (based on the water mass and the dry wood mass), and more preferably about 1-4%. Many dryers appropriate for this task are rotary drums. Hot air or hot flue gas is usually passed through the strand and fine mixture within the rotating drums in order to promote drying. The temperature of the hot air or flue gas at the strand in-feed portion of the dryer can be about 600-1500° C. During the drying process this air cools and the temperature of air exiting the dryer can be as low as about 100° C. It is common for "single-pass" dryers to be at least 40' in length and some dryers (known as triple-pass dryers) can have an effective length of about 120'. Companies that manufacture dryers include Westec America LLC (Vancouver, Wash.). Companies that manufacture strand dryers that operate at lower temperature include George Koch Sons LLC (Evansville, Ind.).

Mixtures of dry strands and fines are then processed through screens in order to separate wooden elements on the basis of size. It is common to discard all or some portion of the fines at this stage in the process. In many cases the fines will be used as fuel in burners that provide hot air for the dryers. It is most common to classify the retained wooden elements into two groups. The average wooden element size will be larger in one group and smaller in the other group. For both groups strands will constitute the dominant portion (>70%) of the wooden elements and fines will constitute a minor portion (<30%) of the wooden elements. Companies that manufacture screens suitable for this stage of the process include the Acrowood Corporation (Everett, Wash.).

The two groups of dried strands are then transported to blenders, such as those manufactured by Coil Manufacturing Ltd (Surrey, BC, Canada). Uncured bonding resin (and wax and potentially other additives, such as preservatives or insecticides) is applied to the strands in the blenders. Generally, one or more blenders will be utilized for the larger strands, and one or more additional blenders will be used for the small strands. Bonding resins that can be applied to the strands in this process include phenol-formaldehyde resins (liquid or powdered), polymeric methylene diphenyl diisocyanate (pMDI), melamine-formaldehyde resins, urea-formaldehyde resins, epoxy resins, or other bonding resins, including acrylic emulsions. The formaldehyde-based resins are commercially available from companies such as Arclin (Mississauga, Ontario) and the Georgia-Pacific Resins Corporation (Decatur, Ga.). The pMDI can be obtained by companies such as BAYER (Pittsburgh, Pa.), Huntsman Chemical Company (The Woodlands, Tex.), and BASF (Wyandotte, Mich.). Acrylic bonding resins can be provided by the Dow Chemical Company (Midland, Mich.). The level of bonding resin applied to the strands can be about 1-20% (on the basis of the solids mass of the resin divided by the dry mass of the wood), but a preferred level is about 6-12%. Waxes that can be applied to the strands include petroleum-based waxes such as those manufactured by the Exxon Chemical Company (Houston, Tex.) or wax emulsions such as those produced by Momentive Specialty Chemicals (Columbus, Ohio). The level of wax that can be applied to the strands is about 0-5.0% (on a solids basis).

Strands that have been coated with bonding resin and optionally wax or other additives are then formed into a mat. In this process, which is usually continuous, it is common for screens to be transported through the forming system on a conveyor. The screens pass underneath multiple "forming stations" which deposit strands. In many cases the strands are incorporated into the mat are aligned deliberately in an orientation that is either predominantly in the machine-direction of the mat, or the cross-direction of the mat (in the plane of the mat, but perpendicular to the machine-direction), or a random mixture of machine and cross-direction. For some applications the final material there will be structural advantages associated with having certain orientations of the strands in certain layers of the mat.

For example, for wall sheathing applications involving 4'×8' panels that are installed with the 8' axis in a horizontal orientation on the wall, there might be an advantage associated with having the surface layer strands randomly oriented in the panel as opposed to being aligned parallel to the 8' axis.

Frequently, there will be as many as 4-6 forming stations in this part of the process, which yield as many different layers of the mat. The different layers of the mat may have different properties, such as different strand composition or dimension; different resin or resin amount; different ratio of strands to resin; different additives; and/or different thicknesses. Typically, the larger strands are utilized in the top and bottom layers of the mat, while the smaller strands are incorporated into the center layer of the mat. The thickness dimension of the strands in the mat should be approximately parallel to the thickness dimension of the whole mat. The thickness of the mat can be about 0.5-15". The width of the mat can be about 0.5-24'. The length of the mat can be as short as about 0.5-24' or the length can be continuous. Companies that manufacture strand forming lines suitable for this technology include The Siemplekamp Group (Marietta, Ga.).

Strand mats are then transported into presses, including continuous or multi-opening presses, such as those made by The Siemplekamp Group (Marietta, Ga.) or Washington Iron Works, Incorporated (Sherman, Tex.). Platens within the press will have a surface temperature of about 150 to 225° C.

An essential and differentiating aspect of the provided embodiments involves the degree to which the mat is compressed in the pressing process, which is less than that associated with an oriented strand board production process. Once a mat has been loaded into a press, the distance between the top and bottom heated platens will be decreased. As the platens are closing there will be a point in time in which the top platen initially contacts the upper portion of the strand mat, and there will be another point in time in which the distance between the top and bottom platens reaches a minimum value (approximately equal to the resulting board thickness).

The time between the top platen initially contacting the top of the mat and the point at which the platens have minimal separation is about 10 to 75 seconds. A preferred closing time is about 15-30 s.

As the press is closing during this process a pressure is exerted on the mat. The pressure can be calculated by dividing the ram force exerted on the platens by the surface area of one major face of the mat. As the press is closing the pressure tends to increase until about the point in time when the distance between the platens is minimized. When conventional oriented strand board is manufactured, the maximum pressure achieved during the pressing cycle is about 500 to 1,000 psi. When panels are made in accordance with the provided embodiments, the maximum pressure achieved during the pressing cycle is about 100-400 psi. Closing cycles characterized with a maximum pressure of about 100-400 psi will ultimately yield a strand-based composite that has a dry wood density of about 15-26 pcf. And a total density of about 15-28 pcf.

In general the gap between the press platens should remain fixed at the minimum value for a period that is about 10-25 seconds per 1/16" of the minimum gap between the press platens. For example, the press platens would remain a fixed minimum value for a period of about 80-200 s for a board that has a thickness of 0.5" (8/16"). Press times that are relatively short can be achieved by using bonding resins that cure faster, such as pMDI, or by use of greater platen temperatures.

In many cases it will be advantageous for the mat entering the press to have a higher moisture content in the surface layers and a lower moisture content in the core layer. The excess moisture in the surface layer tends to be converted rapidly to steam, which is readily transferred into the core layer of the mat and causes the temperature in the core layer of the mat to increase much faster than it would if the only heat transfer mechanism was thermal conduction.

Due to the inherent insulating properties of the partially compressed mat, it is particularly advantageous to introduce a mat that has a moisture content of greater than about 5-12% in the surface layer into the press. In one embodiment this is achieved by use of liquid phenol-formaldehyde resin (5-12% resins solids relative to the dry mass of the wood) in the surface layer and use of pMDI (2-15% pMDI mass relative to the dry mass of the wood) in the core layer of the mat.

In general the press can begin to open as soon as the bonding resin has cured to a level sufficient to achieve an internal bond strength value (Z-directional tensile strength value) of about 20 psi, and the internal mat pressure is less than about 50 psi. The mat has visco-elastic rheological properties and undergoes permanent deformation in the hot press. As a result the pressure that must be exerted on the mat in order to maintain the minimum value between the press platens decreases continuously during the portion of the pressing cycle in which the gap between the press platens is maintained at a constant minimum value. In order to allow internal gas pressures within the mat to escape without causing the strand-to-strand bonds to rupture, it is helpful to open the press slowly. For instance, the end of the pressing cycle could be characterized as increasing the gap between the heated platens by about 0.0001-0.005 inches/second for a period of about 5-30 seconds. Subsequent to an initial slow opening stage the gap between the platens should be opened rapidly, for instance 0.1-1.0 inches/second in order to improve productivity.

Once the gap between the heated platens has opened to a point sufficient to facilitate transport, the compressed mat (composite) is ejected from the press. The thickness of the resulting composite can be about 0.1-6.0", but a preferred thickness is about 0.1-1.5". The width of the composite can be about 0.5-24' and will largely be determined by the width of the mat. Likewise, the length of the resulting composite can be about 0.5-24' or even continuous and will largely be determined by the length of the mat. Again, the average dry, wood density of strands in the resulting composite will be about 15-26 pcf.

Once removed from the press the composite can be cut into small sections that might be more suitable for an intended application. For instance, a composite that has an initial width of 16' and an initial length of 24' might be cut into multiple sections that each have a width of 4' and a length of 8'. The smaller sections might be particularly useful as sheathing panels in a construction application.

The composite is optionally subjected to further secondary processing steps, as known to those of skill in the art, such as profiling the edges, sanding the major surfaces, treating any of the surfaces with sealants or other coatings, marking, printing or stenciling product logos, bar codes or other informative images. Resin-impregnated papers could be attached to one or more of the surfaces of the composite in order to promote surface smoothness, inhibit slivers, protect from water, reduce air-infiltration, or provide other advantages. Other finishing activities can include grading for quality, stacking into units, strapping and packaging.

The thermal resistance values of the composite are greater than about 0.9 hr·ft$^2$F/BTU in the "composite thickness" direction when the dry strand basis weight is about 1.2-1.5 lb/ft$^2$. This compares to conventional oriented strand board, which has thermal resistance value of about 0.45-0.75 hr·ft$^2$F/BTU in the composite thickness dimension when the dry strand basis weight is about 1.2-1.5 lb/ft$^2$. The increased level of void space between the strands contributes to the insulating properties of the new material, but surprisingly this low-density material has strength properties that are similar to or even better than that of conventional oriented strand board with a dry wood density of about 36 pcf or higher. Thus, some versions of the new composite material have thermal resistance values of greater than about 1.2 hr·ft$^2$F/BTU in the composite thickness direction and internal bond strength values of greater than about 50 psi when the dry strand basis weight is about 1.2-1.5 lb/ft$^2$.

In the EXAMPLES below, EXAMPLES 1 and 2 disclose conventional OSB, while EXAMPLES 3-14 disclose various embodiments of the composite disclosed herein. The physical properties of the composites are characterized. Of particular note is the superior thermal insulation provided by the disclosed composites when compared to conventional OSB. This improvement in thermal insulation is made more significant by the discovery that the composites demonstrate similar internal bond strength when compared to OSB. Therefore, thermal insulation is gained in the composites without sacrificing strength.

The following EXAMPLES are included for the purpose of illustrating, not limiting, the embodiments disclosed herein.

EXAMPLES

Example 1

Oriented strand board (OSB) that was representative of conventional OSB was produced on a laboratory-scale in the following manner. Wooden strands (25-50 mils thick, 0.25-1.5" wide, 0.25-5.0" long, southern yellow pine species) designated as "core-layer strands" were dried to a moisture content of about 2-3% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax emulsion, known as EW58LV (manufactured by Momentive Specialty Chemicals Incorporated in Columbus, Ohio), was sprayed onto the wooden strands at a loading level of 0.25% based on the solids content of the emulsion and the dry mass of the wood. A phenol-formaldehyde based bonding resin, known as 13C042 (manufactured by Arclin Performance Applied in Mississauga, Ontario, Canada) was then sprayed onto the strands at a loading level of 3.25% based on the solids content of the resin and the dry mass of the wood. The treated core-layer strands were then removed from the blender.

Additional wooden strands (25-50 mils thick, 0.25-1.5" wide, 0.25-5.0" long, southern yellow pine species) designated as "surface-layer strands" were dried to a moisture content of about 2-3% and were then loaded into the blender compartment. A conventional slack wax emulsion, known as EW58LV (manufactured by Momentive Specialty Chemicals Incorporated in Columbus, Ohio), was sprayed onto the wooden strands at a loading level of 0.25% based on the solids content of the emulsion and the dry mass of the wood. A phenol-formaldehyde based bonding resin, known as 52WHA (manufactured by Momentive Specialty Chemicals Incorporated in Columbus, Ohio) was then sprayed onto the strands at a loading level of 3.25% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The total mass of the mat was about 2,920 g. The two surface layers constituted 59% of the mass of the mat, while the two core layers constituted 41% of the mass of the mat. The thickness of the mat was about 3".

The mat, as well as the caul plate and screen that were supporting the mat, were then transferred onto the bottom platen of an 'open' hot-press. The top and bottom platens were maintained at a surface temperature of 405° F. A control system was immediately activated in order to begin closing the gap between the top and bottom platens until the distance between them was 0.438". The time required to achieve this compression process was about 60 s. The maximum pressure exerted on the mat was about 750-775 psi. The gap between the platens was maintained at 0.438" for a period of 160 s and was then increased to 0.468" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. Six test specimens (2"×2") were cut from each conditioned laboratory panel. Each test specimen was then subjected to an 'as-is' internal bond strength test (ASTM D1037). Similar panels manufactured in a production environment (OSB mill located in Arcadia, La. by Weyerhaeuser NR) were subjected to a thermal resistance test (ASTM C518). Portions of this production panel were cut with a fine saw to yield two thin layers (0.150"×3.0"×3.0") from the surface layer of the board and then an additional two thin layers (0.150"×3.0"×3.0") from the core layer of the board. These specimens were subjected to a Gurley porosity test (larger test values are associated with lower levels of porosity).

TABLE 1

Average Property Values of Conventional OSB (Example 1)

| Dry Wood Density (lb/ft$^3$) | Dry Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (h · ft$^2$F/BTU) |
|---|---|---|---|---|---|
| 41.0 | 1.50 | 89.0 | 50.6 | 5.5 | 0.554 |

Example 2

Oriented strand board (OSB) (7/16" thick, Performance Rated Sheathing) that was representative of conventional OSB was produced at five different OSB mills that were owned and operated in the United States and Canada by Weyerhaeuser NR (Federal Way, Wash.). Samples of this material were subjected to an 'as-is' internal bond strength test (ASTM D1037) and a thermal resistance test (ASTM C518).

TABLE 2

Average Property Values of Conventional OSB (Example 2)

| Weyerhaeuser OSB 7/16" Conventional Sheathing Type | Dry Wood Density (lb/ft$^3$) | Dry Wood Basis Weight (lb/ft$^2$) | Internal Bond Strength (PSI) | Thermal Resistance (hr · ft$^2$F/BTU) |
|---|---|---|---|---|
| A | 40.1 | 1.44 | 48.4 | 0.615 |
| B | 43.6 | 1.59 | 66 | 0.576 |
| C | 40.0 | 1.47 | 56.3 | 0.576 |
| D | 34.2 | 1.24 | 30.6 | 0.732 |
| E | 41.4 | 1.49 | 46 | 0.554 |

Example 3

A wooden, strand-based composite that was representative of the embodiments disclosed herein was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 8.0% based on the solids content of the resin and the dry mass of the wood. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The total mass of the mat was about 3220 g. The surface layers constituted 45% of the mass of the mat while the core layers constituted 55% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The maximum pressure exerted on the mat was about 275 psi. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518). Portions of each panel were cut with a fine saw to yield two thin layers (0.150"×3.0"×3.0") from the surface layer of the board and then an additional two thin layers (0.150"×3.0"×3.0") from the core layer of the board. These specimens were subjected to a Gurley porosity test (larger test values are associated with lower levels of porosity).

TABLE 3

Average Property Values of Representative Embodiment of Strand-Based Insulation Board (Example 3)

| Caliper (Inches) | Dry Wood Density (lb/ft$^3$) | Dry Wood Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
| --- | --- | --- | --- | --- | --- | --- |
| 0.742 | 26.0 | 1.61 | 63.4 | 9.7 | 5.1 | 1.300 |

One test specimen (5"×5") was cut from one of the panels and subjected to a water vapor transmission rate test (ASTM E96). The test value was 3.02 perms, which compares to a water vapor transmission rate test value of <0.3 perms for a ½" foam insulation board known as Styrofoam SIS Structural Insulated Sheathing produced by The Dow Chemical Company (Midland, Mich.) and 0.49 perms for 23/32" conventional oriented strand board as reported by the American Plywood Association (Tacoma, Wash.).

Example 4

A wooden, strand-based composite that was representative of the disclosed embodiments was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The total mass of the mat was about 3220 g. The surface layers constituted 50% of the mass of the mat and the core layers also constituted 50% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The maximum pressure exerted on the mat was about 295 psi. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 4

Average Property Values of Representative Embodiment of Strand-Based Insulation Board (Example 4)

| Caliper (Inches) | Dry Wood Density (lb/ft$^3$) | Dry Wood Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
|---|---|---|---|---|---|---|
| 0.716 | 27.0 | 1.61 | 52.2 | 14.3 | 6.4 | 1.192 |

One test specimen (5"×5") was cut from one of the panels and subjected to a water vapor transmission rate test (ASTM E96). The test value was 2.01 perms, which compares to a water vapor transmission rate test value of <0.3 perms for a ½" foam insulation board known as Styrofoam SIS Structural Insulated Sheathing produced by The Dow Chemical Company (Midland, Mich.) and 0.49 perms for 23/32" conventional oriented strand board as reported by the American Plywood Association (Tacoma, Wash.).

Example 5

A wooden, strand-based composite that was representative of the disclosed embodiments was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The mass of the two surface layers was equal to the mass of the two core layers. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.740". The time required to achieve this compression process was about 60 s. The gap between the platens was maintained at 0.740" for a period of 190 s and was then increased to 0.779" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h.

A phenol-formaldehyde resin-impregnated kraft paper with pre-applied PF bonding resin on one face, known as 357P, was manufactured by Panel Technology Incorporated (Hoquiam, Wash.), was laminated to the top and bottom major faces of the strand-based insulation board by use of a hot-press (platen temperature=400° F. with the platens separated by a gap of 0.720" for a period of 60 s).

The panel was then removed from the press and placed into a conditioning chamber that was maintained at a relative humidity of 50% and a temperature of 20° C.

Six test specimens (2"×2") were cut from the conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 5

Average Property Values of Representative Embodiment of Strand-Based Insulation Board (Example 5)

| Caliper (Inches) | Dry Wood Density (lb/ft³) | Dry Wood Basis Weight (LB/FT²) | Internal Bond Strength (PSI) | Thermal Resistance (hr · ft²F/BTU) |
|---|---|---|---|---|
| 0.704 | 23.2 | 1.36 | 34.0 | 1.280 |

Example 6

A wooden, strand-based composite that was representative of the disclosed embodiments was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The mass of the two surface layers was equal to the mass of the two core layers. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.800". The time required to achieve this compression process was about 60 s. The gap between the platens was maintained at 0.800" for a period of 190 s and was then increased to 0.839" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h.

A phenol-formaldehyde resin-impregnated kraft paper with pre-applied PF bonding resin on one face, known as 357P, was manufactured by Panel Technology Incorporated (Hoquiam, Wash.), was laminated to the top and bottom major faces of the strand-based insulation board by use of a hot-press (platen temperature=400° F. with the platens separated by a gap of 0.780" for a period of 60 s).

The panel was then removed from the press and placed into a conditioning chamber that was maintained at a relative humidity of 50% and a temperature of 20° C.

Six test specimens (2"×2") were cut from the conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 6

Average Property Values of Representative Embodiment of Strand-Based Insulation Board (Example 6)

| Caliper (Inches) | Dry Wood Density (lb/ft³) | Dry Wood Basis Weight (lb/ft²) | Internal Bond Strength (PSI) | Thermal Resistance (hr · ft²F/BTU) |
|---|---|---|---|---|
| 0.792 | 23.7 | 1.56 | 19.4 | 1.363 |

Example 7

A wooden, strand-based composite that was representative of the disclosed embodiments was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The mass of the two surface layers was equal to the mass of the two core layers. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.719". The time required to achieve this compression process was about 60 s. The gap between the platens was maintained at 0.719" for a period of 190 s and was then increased to 0.758" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h.

A phenol-formaldehyde resin-impregnated kraft paper, (70 lb/Mft$^2$) was manufactured by Arclin Performance Applied (Tacoma, Wash.) and was laminated to the top and bottom major faces of the strand-based insulation board by use of a PVAc latex adhesive (WD-2823LV) from Specialty Polymers (Woodburn, Oreg.). The laminate was assembled and was then placed under a 250 lb weight at a temperature of 20° C. for a period of three days.

The panel was then removed from under the weight and placed into a conditioning chamber that was maintained at a relative humidity of 50% and a temperature of 20° C.

One test specimen (12"×12") was cut from each panel and subjected to a thermal resistance test (ASTM C518).

TABLE 7

Average Property Values of Representative Embodiment of Strand-Based Insulation Board (Example 7)

| Caliper (Inches) | Dry Wood Density (lb/ft$^3$) | Dry Wood Basis Weight (lb/ft$^2$) | Thermal Resistance (hr · ft$^2$F/BTU) |
| --- | --- | --- | --- |
| 0.743 | 19.8 | 1.23 | 1.416 |

Example 8

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The surface layers constituted 50% of the mass of the mat and the core layers also constituted 50% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

lands, Tex.) was then sprayed onto the strands at a loading level of 8.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers

TABLE 8

Average Property Values of Representative Embodiment of Strand-Based Insulation Board (Example 8)

| Caliper (Inches) | Dry Wood Density (LB/FT$^3$) | Dry Wood Basis Weight (LB/FT$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
|---|---|---|---|---|---|---|
| 0.723 | 24.3 | 1.46 | 10.3 | 0.7 | 0.2 | 1.401 |

Example 9

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Wood-were not oriented in any particular direction in the major plane of the mat, but the core layer strands were generally parallel to one of the major axis of the mat. The surface layers constituted 50% of the mass of the mat and the core layers also constituted 50% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 9

Average Property Values of Representative Embodiment of
Strand-Based Insulation Board (Example 9)

| Caliper (Inches) | Dry Wood Density (lb/ft³) | Dry Wood Basis Weight (lb/ft²) | Internal Bond Strength (PSI) | Gurley Porosity for Surface Layer (s/100 mL of air to pass) | Gurley Porosity for Core Layer (s/100 mL of air to pass) | Thermal Resistance (hr · ft²F/BTU) |
|---|---|---|---|---|---|---|
| 0.714 | 24.3 | 1.45 | 10.5 | 1.4 | 0.3 | 1.291 |

Example 10

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 6.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The surface layers constituted 45% of the mass of the mat and the core layers also constituted 55% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 10

Average Property Values of Representative Embodiment of
Strand-Based Insulation Board (Example 10)

| Caliper (Inches) | Dry Wood Density (LB/FT³) | Dry Wood Basis Weight (LB/FT²) | Internal Bond Strength (PSI) | Gurley Porosity for Surface Layer (s/100 mL of air to pass) | Gurley Porosity for Core Layer (s/100 mL of air to pass) | Thermal Resistance (hr · ft²F/BTU) |
|---|---|---|---|---|---|---|
| 0.749 | 23.5 | 1.47 | 9.7 | 0.6 | 0.5 | 1.340 |

Example 11

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 8.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The surface layers constituted 45% of the mass of the mat and the core layers also constituted 55% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

TABLE 11

Average Property Values of Representative Embodiment of Strand-Based Insulation Board (Example 11)

| Caliper (Inches) | Dry Wood Density (lb/ft$^3$) | Dry Wood Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
|---|---|---|---|---|---|---|
| 0.750 | 23.0 | 1.44 | 9.4 | 0.2 | 0.2 | 1.388 |

Example 12

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 8.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The surface layers constituted 45% of the mass of the mat and the core layers also constituted 55% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

Example 13

A wooden, strand-based composite that was representative of the disclosed embodiments was produced on a laboratory-scale in the following manner. Wooden strands (25-50 mils thick, 0.25-1.5" wide, 0.25-5.0" long, mixed species from the state of West Virginia including yellow poplar) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.50% based on the dry mass of the wood. Water was sprayed onto the strands at a loading level of 2% based on the dry mass of the wood. PMDI, known as Rubinate 1840 (manufactured by Huntsman Polyurethanes in The Woodlands, Tex.) was then sprayed onto the strands at a loading level of 8.0% based on the solids content of the resin and the dry mass of the wood. The treated core-layer strands were then removed from the blender.

Additional wooden strands (25-50 mils thick, 0.25-1.5" wide, 0.25-5.0" long, mixed species from the state of West Virginia including yellow poplar) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.50% based on the dry mass of the wood. A phenol-formaldehyde based bonding resin, known as 159C45 (manufactured by the Georgia-Pacific Resin Corporation) was then sprayed onto the strands at a loading level of 8.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were not oriented in any particular direction in the major plane of the mat, but the core layer strands were generally parallel to one of the major axis of the mat. The surface

TABLE 12

Average Property Values of Representative Embodiment of Strand-Based Insulation Board (Example 12)

| Caliper (Inches) | Dry Wood Density (lb/ft$^3$) | Dry Wood Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
|---|---|---|---|---|---|---|
| 0.742 | 20.4 | 1.26 | 2.1 | 0.1 | 0.4 | 1.508 | layers constituted 45% of the mass of the mat and the core layers also constituted 55% of the mat. The thickness of the mat was about 3".

The mat, as well as the caul plate and screen that were supporting the mat, were then transferred onto the bottom platen of an 'open' hot-press. The top and bottom platens were maintained at a surface temperature of 420° F. A control system was immediately activated in order to begin closing the gap between the top and bottom platens until the distance between them was 0.730". The time required to achieve this compression process was about 45 s. The gap between the platens was maintained at 0.730" for a period of 205 s and was then increased to 0.769" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Six test specimens (2"×2") were cut from each conditioned laboratory panel. Each test specimen was then subjected to an 'as-is' internal bond strength test (ASTM D1037). One test specimen (12"×12") was cut from each panel and subjected to a thermal resistance test (ASTM C518).

in The Woodlands, Tex.) was then sprayed onto the strands at a loading level of 3.0% based on the solids content of the resin and the dry mass of the wood. An expandable graphite powder, type 3772 from Anthracite Industries Incorporated (Sunbury, Pa.), was then added to the blender. The treated core-layer strands were then removed from the blender.

Additional wooden strands (25-50 mils thick, 0.25-1.5" wide, 0.25-5.0" long, aspen and black poplar species) designated as "surface-layer strands" were dried to a moisture content of about 2-3% and were then loaded into the blender compartment. A conventional slack wax (manufactured by Exxon Mobil in Houston, Tex.), was sprayed onto the wooden strands in a molten state at a loading level of 0.75% based on the dry mass of the wood. A phenol-formaldehyde based bonding resin, known as EF57 (manufactured by Momentive Specialty Chemicals Incorporated in Columbus, Ohio) was then sprayed onto the strands at a loading level of 3.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to

TABLE 13

Average Property Values of Representative Embodiment of Strand-Based Insulation Board (Example 13)

| Caliper (Inches) | Dry Wood Density (lb/ft$^3$) | Dry Wood Basis Weight (lb/ft$^2$) | Internal Bond Strength (PSI) | Gurley Porosity for Surface Layer (s/100 mL of air to pass) | Gurley Porosity for Core Layer (s/100 mL of air to pass) | Thermal Resistance (hr · ft$^2$F/BTU) |
|---|---|---|---|---|---|---|
| 0.730 | 17.3 | 1.05 | 0.4 | 0.1 | 0.0 | 1.744 |

Example 14

A wooden, strand-based composite that was representative of the disclosed embodiments was produced on a laboratory-scale in the following manner. Wooden strands (25-50 mils thick, 0.25-1.5" wide, 0.25-5.0" long, aspen and black poplar species) designated as "core-layer strands" were dried to a moisture content of about 2% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax (manufactured by Exxon Mobil in Houston, Tex.), was sprayed onto the wooden strands in a molten state at a loading level of 0.75% based on the dry mass of the wood. Water was sprayed onto the strands at a loading level of 2% based on the dry mass of the wood. PMDI, known as Rubinate 1840 (manufactured by Huntsman Polyurethanes the surface strand orientation. The surface layers constituted 50% of the mass of the mat and the core layers also constituted 50% of the mat. The thickness of the mat was about 3".

The mat, as well as the caul plate and screen that were supporting the mat, were then transferred onto the bottom platen of an 'open' hot-press. The top and bottom platens were maintained at a surface temperature of 410° F. A control system was immediately activated in order to begin closing the gap between the top and bottom platens until the distance between them was 1.125". The time required to achieve this compression process was about 60 s. The gap between the platens was maintained at 1.125" for a period of 325 s and was then increased to 1.164" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

One test specimen (12"×12") was cut from the panel and subjected to a thermal resistance test (ASTM C518).

TABLE 14

Average Property Values of Representative Embodiment of
Strand-Based Insulation Board (Example 14)

| Caliper (Inches) | Dry Wood Density (lb/ft³) | Dry Wood Basis Weight (lb/ft²) | Thermal Resistance (hr · ft²F/BTU) |
|---|---|---|---|
| 1.067 | 23.4 | 2.08 | 1.934 |

While illustrative embodiments have been illustrated and described, it will be appreciated that various changes can be made therein without departing from the spirit and scope of the disclosed embodiments.

The embodiments in which an exclusive property or privilege is claimed are defined as follows:

1. A composite having a thickness dimension, consisting essentially of:
   a compressed plurality of wooden strands, each having length, width, and thickness dimensions, wherein the wooden strands are oriented such that the length and width dimensions are each orthogonal to the thickness dimension of the composite; and
   cured bonding resin structurally connecting the plurality of wooden strands;
   wherein the wooden strands have a dry specific gravity of about 0.30 to 0.45; and
   wherein the average dry density of the wooden composite is from about 15 to about 24 pounds per cubic foot.

2. The composite of claim 1, wherein the wooden strands are selected from the group consisting of alder, aspen, basswood, eastern cottonwood, hemlock, black poplar, yellow poplar, lodgepole pine, red pine, sugar pine, white pine, juvenile southern yellow pine, fir, and combinations thereof.

3. The composite of claim 1, wherein the wooden strands have a thickness of from about 0.010 inches to about 0.150 inches.

4. The composite of claim 1, wherein the wooden strands have a thickness of from about 0.015 inches to about 0.050 inches.

5. The composite of claim 1, wherein the length of the wooden strands is from about 0.25 inches to about 8.0 inches.

6. The composite of claim 1, wherein the width of the wooden strands is from about 0.100 inches to about 2.0 inches.

7. The composite of claim 1, wherein the width of the wooden strands is from about 0.25 inches to about 1.50 inches.

8. The composite of claim 1, wherein the width and length of the wooden strands are each at least ten times greater than the thickness of the wooden strands.

9. The composite of claim 1, wherein the length of the wooden strands are greater than the width of the wooden strands.

10. The composite of claim 1, wherein the cured bonding resin is selected from the group consisting of cured resins of phenol-formaldehyde, melamine-formaldehyde, urea-formaldehyde, epoxy, polyurea, polyurethane, and combinations thereof.

11. The composite of claim 1, wherein the cured bonding resin is from about 1.0 wt % to about 20.0 wt % of the composite.

12. The composite of claim 1, wherein the thickness of the composite is at least five times smaller than each of a width dimension and a length dimension of the composite.

13. The composite of claim 1, wherein the thickness of the composite is from about 0.1 inches to about 5.5 inches.

14. The composite of claim 1, wherein the composite has a thermal resistance value in the thickness dimension of greater than 0.9 hr·ft²F/BTU with a corresponding dry strand basis weight of about 1.5 lb/ft².

15. The composite of claim 1, wherein the composite has an internal bond strength of greater than about 20 PSI.

16. The composite of claim 1, wherein the composite has a dry specific gravity of about 0.45 or less.

17. The composite of claim 1, wherein the composite is an oriented strandboard.

18. The composite of claim 1, wherein the composite is one layer in an assembly comprising a plurality of layers of composites formed from wooden strands and cured bonding resin, wherein at least two of the plurality of layers differ in composition in at least one characteristic selected from the group consisting of wooden strand type, wooden strand dimension, wooden strand orientation, bonding resin type, bonding resin amount, ratio of wooden strand to bonding resin, presence of an additive, and type of additive.

19. The composite of claim 1, wherein at least 50% the wooden strands are selected from the group consisting of alder, aspen, basswood, eastern cottonwood, hemlock, black poplar, yellow poplar, lodgepole pine, red pine, sugar pine, white pine, juvenile southern yellow pine, fir, and combinations thereof.

* * * * *